Figure 1:
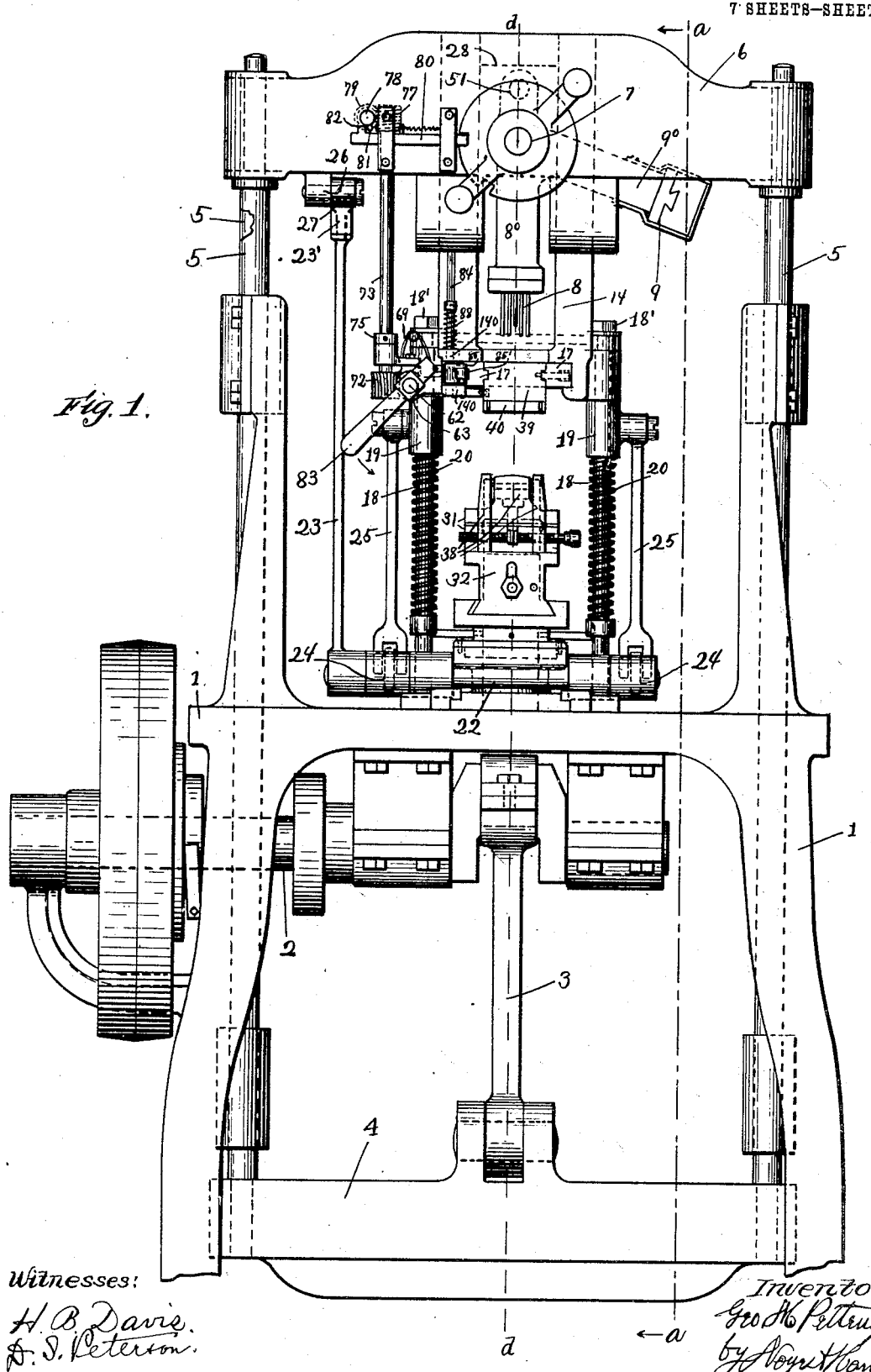

G. M. PETTENGILL.
HEEL NAILING MACHINE.
APPLICATION FILED NOV. 6, 1909.

1,119,763.

Patented Dec. 1, 1914.

7 SHEETS—SHEET 1.

Witnesses:
H. B. Davis.
D. S. Peterson.

Inventor:
Geo. M. Pettengill
by Noyes Harriman
Attys

G. M. PETTENGILL.
HEEL NAILING MACHINE.
APPLICATION FILED NOV. 6, 1909.

1,119,763.

Patented Dec. 1, 1914.
7 SHEETS—SHEET 3.

Witnesses:
H. B. Davis.
D. J. Peterson.

Inventor:
Geo. M. Pettengill
by Noyes & Kinnicutt
Attys.

G. M. PETTENGILL.
HEEL NAILING MACHINE.
APPLICATION FILED NOV. 6, 1909.
1,119,763.
Patented Dec. 1, 1914.
7 SHEETS—SHEET 4.
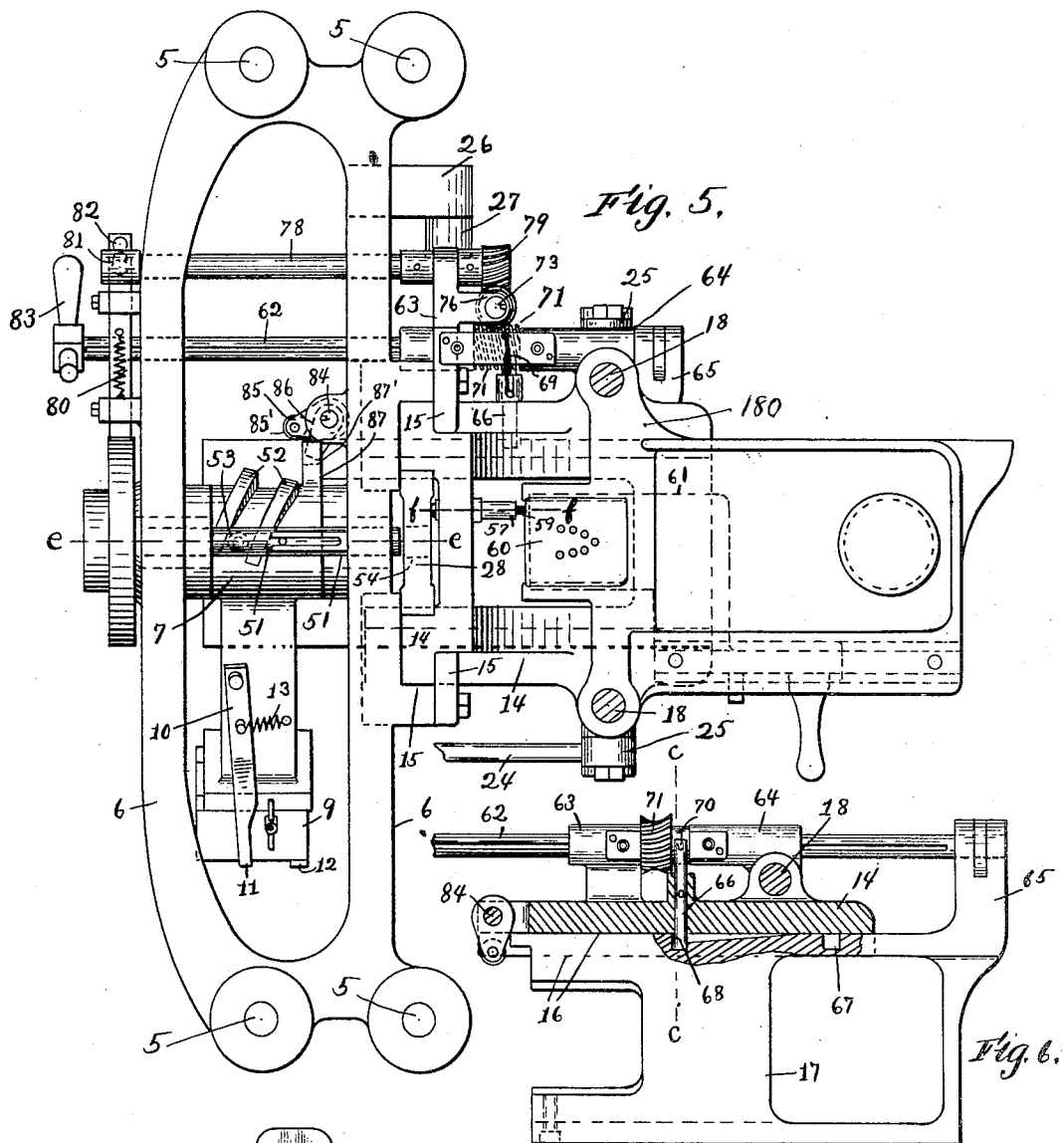
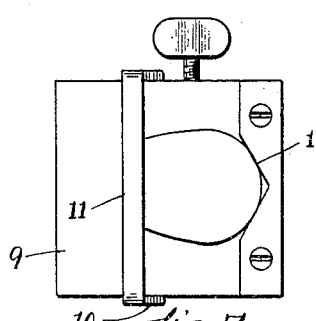
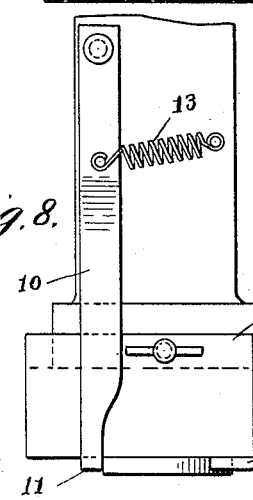
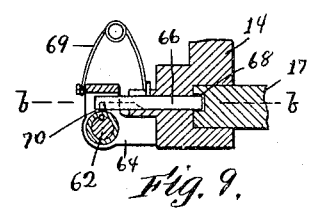
Witnesses:
H. B. Davis
D. S. Peterson
Inventor:
Geo. M. Pettengill
by Roger H. Hamman
Att'ys

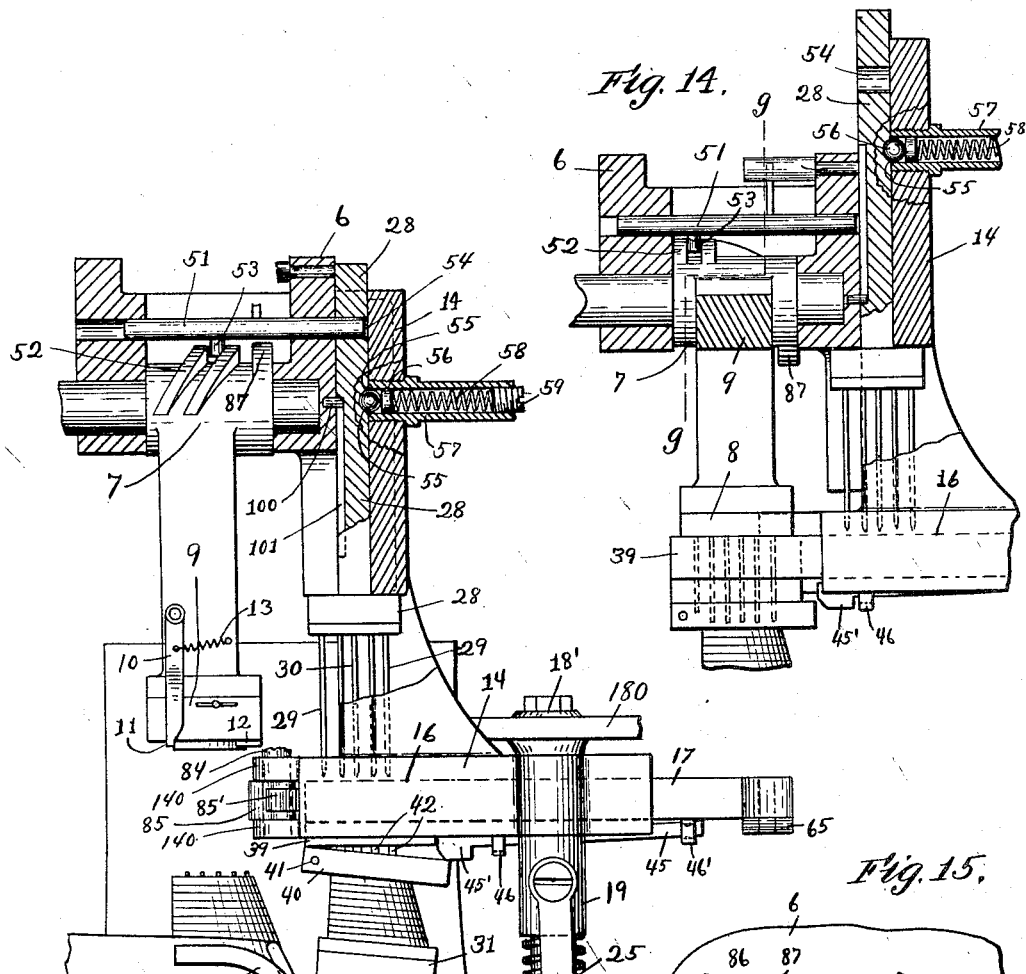

G. M. PETTENGILL.
HEEL NAILING MACHINE.
APPLICATION FILED NOV. 6, 1909.
1,119,763.
Patented Dec. 1, 1914.
7 SHEETS—SHEET 7.
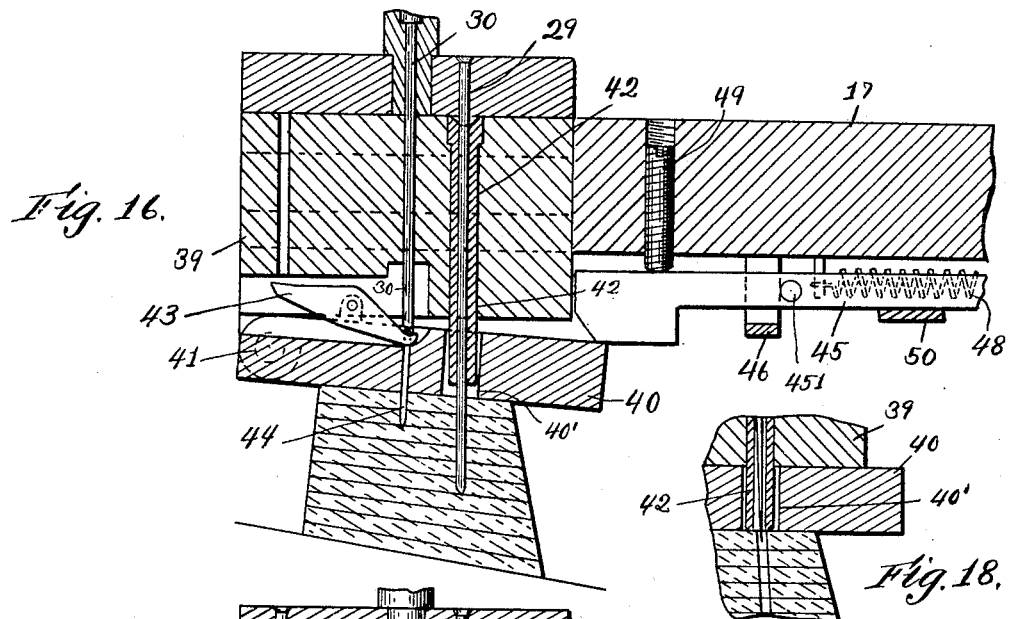
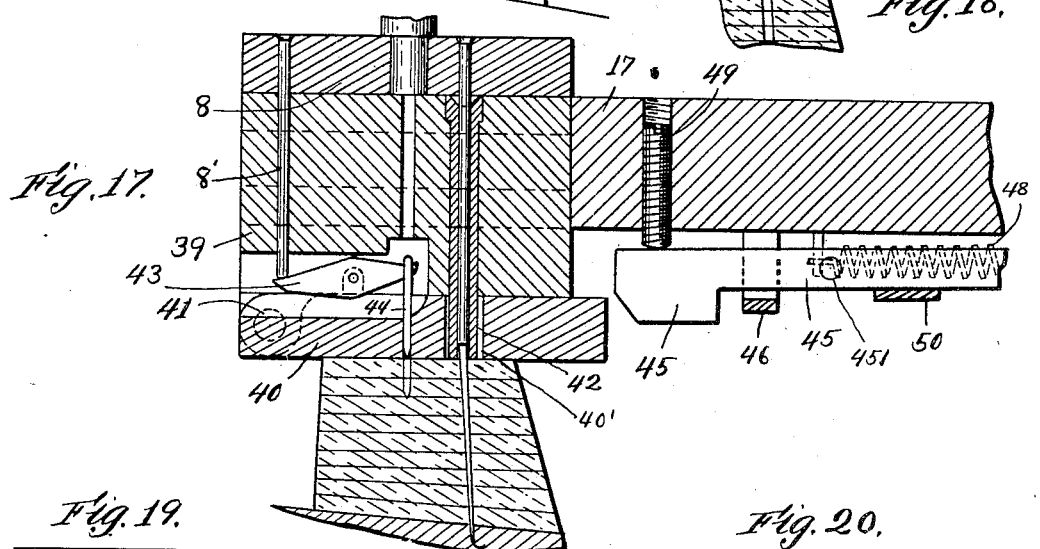
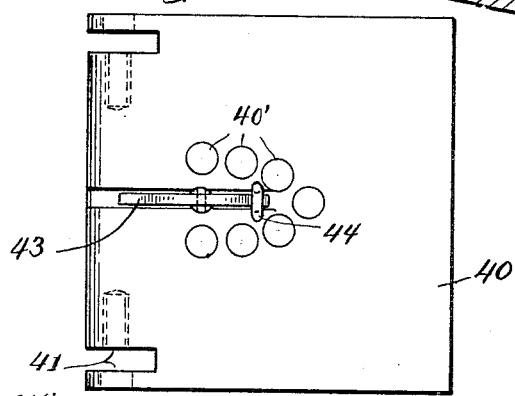
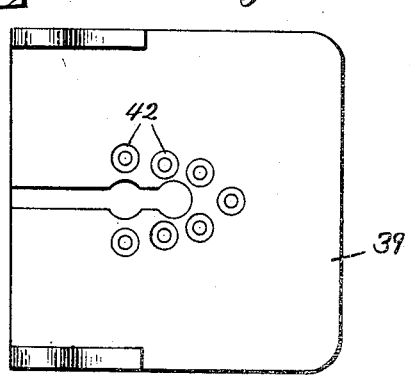
Witnesses:
H. B. Davis.
D. S. Peterson.
Inventor:
Geo. M. Pettengill
by Roys & Harriman
Attys

UNITED STATES PATENT OFFICE.

GEORGE M. PETTENGILL, OF HAVERHILL, MASSACHUSETTS, ASSIGNOR TO HAVERHILL SHOE MACHINERY COMPANY, A CORPORATION OF MAINE.

HEEL-NAILING MACHINE.

1,119,763. Specification of Letters Patent. Patented Dec. 1, 1914.

Application filed November 6, 1909. Serial No. 526,561.

*To all whom it may concern:*

Be it known that I, GEORGE M. PETTENGILL, of Haverhill, county of Essex, and State of Massachusetts, have invented an Improvement in Heel-Nailing Machines, of which the following is a specification.

This invention relates to certain improvements in heel-nailing machines and particularly those of the vertically-moving crosshead type shown in my prior Patent No. 861,051, dated July 23, 1907, in which a heel is pricked on a holder in the rear of the jack, simultaneously with the spanking on of the top-lift on the heel of a shoe on the jack, means being provided for transferring the heel which has been pricked to the jack, so that it may be attached on the next movement of the crosshead. In the machine of said patent a heel-holder was provided which was made adjustable to different inclinations to enable the heels to be pricked at corresponding inclinations, but, as the heel-engaging face of the nail-plate, in a machine of this character, is necessarily held perpendicular to the drivers during the nailing operation, when a heel was to be pricked at a rearward inclination and the heel-plate was clamped against the top of the heel to hold it in place while it was being pricked, the plate would only bear on the front edge portion thereof, so that, in case the perpendicular line from the upper breast edge falls in front of the base of the heel, when resting on a holder in position to be pricked, (as where the heel is considerably undercut at the breast, so that the breast inclines forwardly from the base of the heel,) the heel would be tipped up on the front edge of its seat until its top bore against the face of the nail-plate. The heel would thus be supported only on the holder adjacent its breast, so that, when the awls engage it, the awls adjacent the breast or front would be forced into the heel at once, while those in the rear thereof would not enter it until they had tipped the heel back against the rear portion of the holder. The result was that the front awls would enter the heel perpendicularly to its top for some distance, before the heel was tipped back, and, when it was tipped back by the rear awls, the front awls would either be bent or broken, and in any event would prick holes at different inclinations than those pricked by the rear awls, with the result that the nails when driven would not be driven in parallel directions, and the front nails would frequently either be crippled, or be caused to be driven in such directions that they would pass so close to the breast of the heel as to be later engaged by the breasting-knife, so that the nails which it was particularly necessary to drive at a rearward inclination would be driven perpendicularly, or even toward the breast of the heel. It was, therefore, under these conditions, possible to prick the heel only to a comparatively small depth, when pricking the heel at an inclination, such a depth being entirely inadequate when it was desired to nail a high heel in one deck, or at one operation. As the heel was not, under the above-described conditions, pressed firmly against the holder, it would also frequently slip out of place on the holder, causing difficulties which will be obvious. Under the above-described conditions, if the angle at which a heel was pricked, *i. e.*, the angular relation between the top of the heel and the awls, varied materially from a right angle, when the heel was drawn against the heel-engaging face of the nail-plate to withdraw the awls, as said face was perpendicular to the awls, the heel would then tip, if it had not tipped on the entering movement, so that the awls would be caused to bind, and, in many instances, to be broken or otherwise rendered unsuitable for further use. Under these conditions, as when the awls were forced into the heels, the greater the depth to which the heels were pricked, the greater would be the difficulties encountered.

The principal objects of my invention are to provide means for clamping the heel securely in the desired position on the holder, so that it will not be tipped or moved, as the awls are forced therein, and for holding the heel at the same angle to the awls, when the awls are withdrawn therefrom, as that at which it was held when they were forced into it, so that the heel may be pricked at any inclination and to any depth desired, the awl-holes may be formed so that the nails may be driven practically in exact parallel, the awls will not be bent or broken, and binding, or cramping of the awls when they are withdrawn, will not be caused.

In the same connection I have as an object to provide means whereby the heel-engaging face of the nail-plate will be held perpendicular to the drivers during the nailing operation, so that high heels (heels approximately two inches in height) of pulp or leather may be nailed in one deck, or at one operation, thereby obviating the necessity of attaching the heel in two decks, or pricking them in a separate machine before they are attached, as is frequently necessary, and making a large saving in labor cost, and the cost of the heels.

In pricking heels it is necessary that the awls be guided in close proximity to the point at which they enter the heel, and for this reason, a further object of my invention is to provide, in connection with the means for accomplishing the objects above referred to, a guiding means which is adapted to guide the awls in close proximity to the heel, independently of the means for holding the heel from tilting as the awls are forced into it or withdrawn therefrom.

Before performing the pricking and nailing operations in the machine disclosed in my said prior patent, it was necessary to clamp the heel onto the heel-holder by hand, and this method was to an extent ineffective, as the heel was not held with sufficient security, and the operation caused delay. For these reasons, a further object of my invention is to provide a suitable and effective means for automatically clamping the heels with a uniform pressure under all conditions of height of heel, or adjustment of the heel-holder or jack, before the awls enter the heel to prick it, or the nails are engaged by the drivers to nail it.

When heels are pricked to a considerable depth, much force is necessarily placed on the plate against which the heel is drawn to withdraw the awls from the heel, and a further object of my invention is to provide an automatic locking device for the parts which hold the plate while the awls are being withdrawn, which will effectively resist said force.

In prior machines of this type it has been customary for the boy who sticks the nails, to move the nail-plate slide to its different positions, and, as his time is more fully occupied than is that of the operator, a further object of my invention is to provide means whereby the boy may be relieved of a portion of this work and the operator may change the positions of the turret and the slide by operating a single handle and without consuming an appreciably greater amount of time than was previously used in changing the turret.

As, in the practical operation of a machine of the character shown in my said prior patent, accidents have sometimes occurred from the lowering of the crosshead when the nail-plate slide was in the nailing position and the turret and heel-pricking devices were in the position to spank on the top-lift and prick the next heel, a further object of my invention is to provide interlocking devices which will render it impossible for the turret and nail-plate to be held in any relative positions other than the relative positions in which they should be held when the crosshead is lowered.

The rack and pinion arrangement for connecting the crosshead to the awl-holder, disclosed in my said prior patent, has been found to be of insufficient strength and durability to withstand the usage to which it is likely to be subjected, and a further object of my invention is to provide an improved means for holding the awl-holder in its different positions with relation to the crosshead, and for rigidly connecting the same thereto during the pricking operation, so that all possible breakage of the connecting parts is obviated, and the durability thereof is greatly increased.

Further objects of my invention are to improve the construction of my said prior machine in certain details so that it will be more serviceable.

I accomplish these objects by the means shown in the accompanying drawings, in which—

Figure 2:
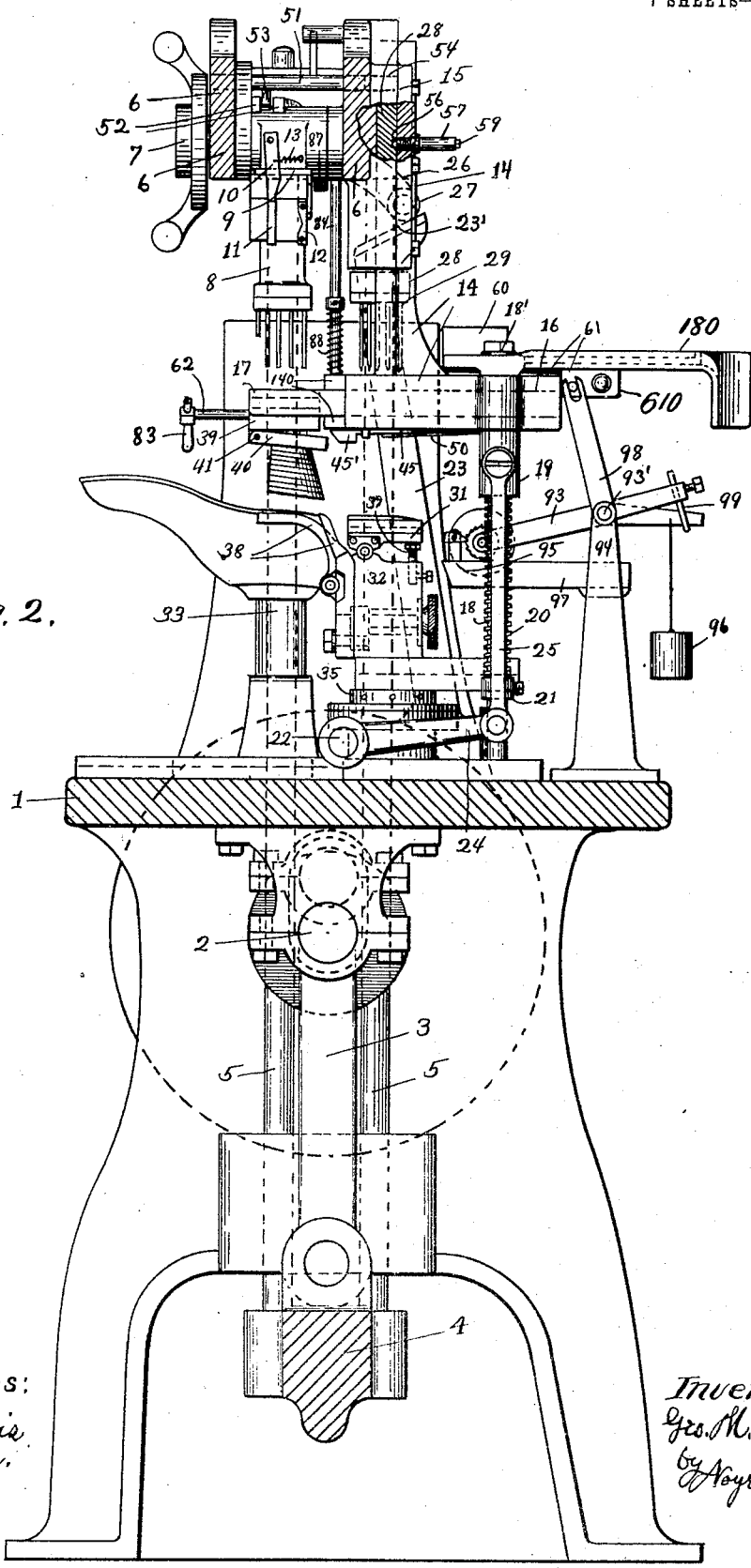
Figure 3:
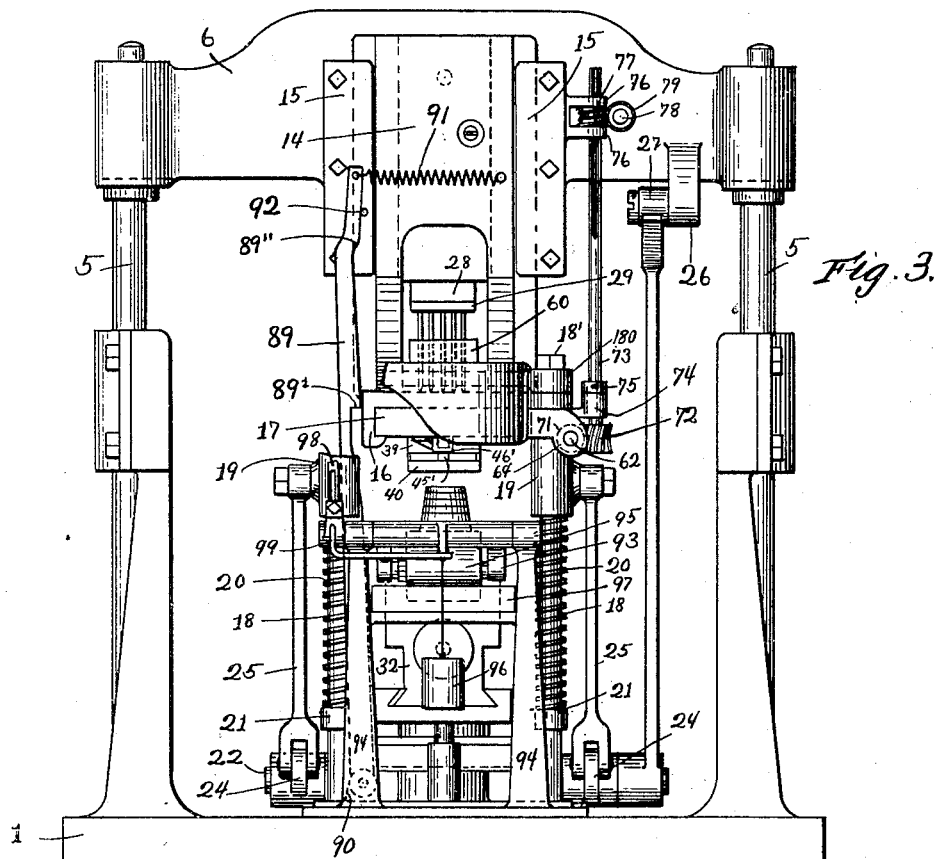
Figure 4:
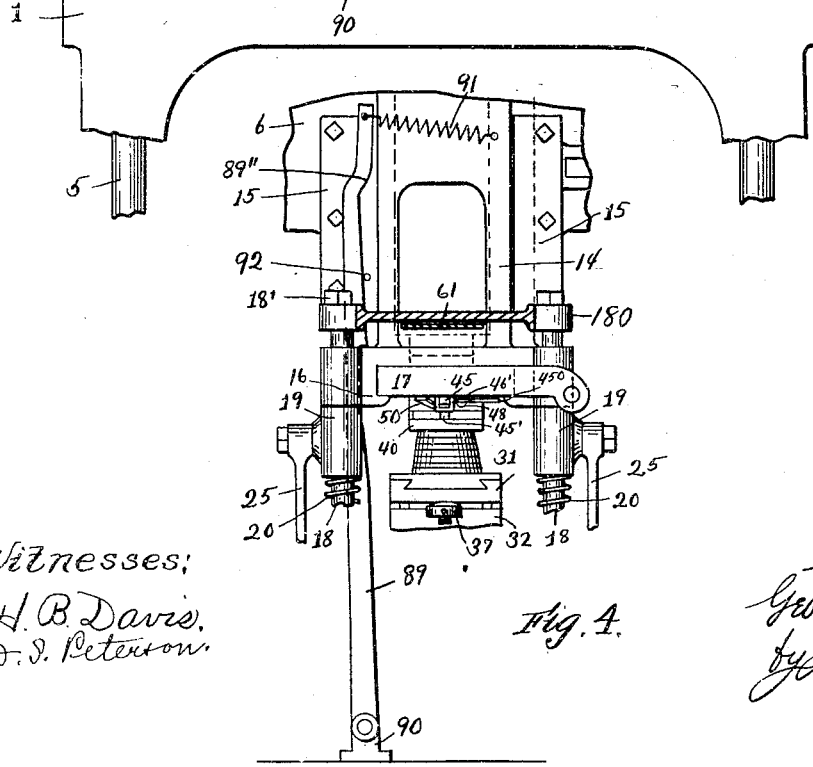
Figure 10:
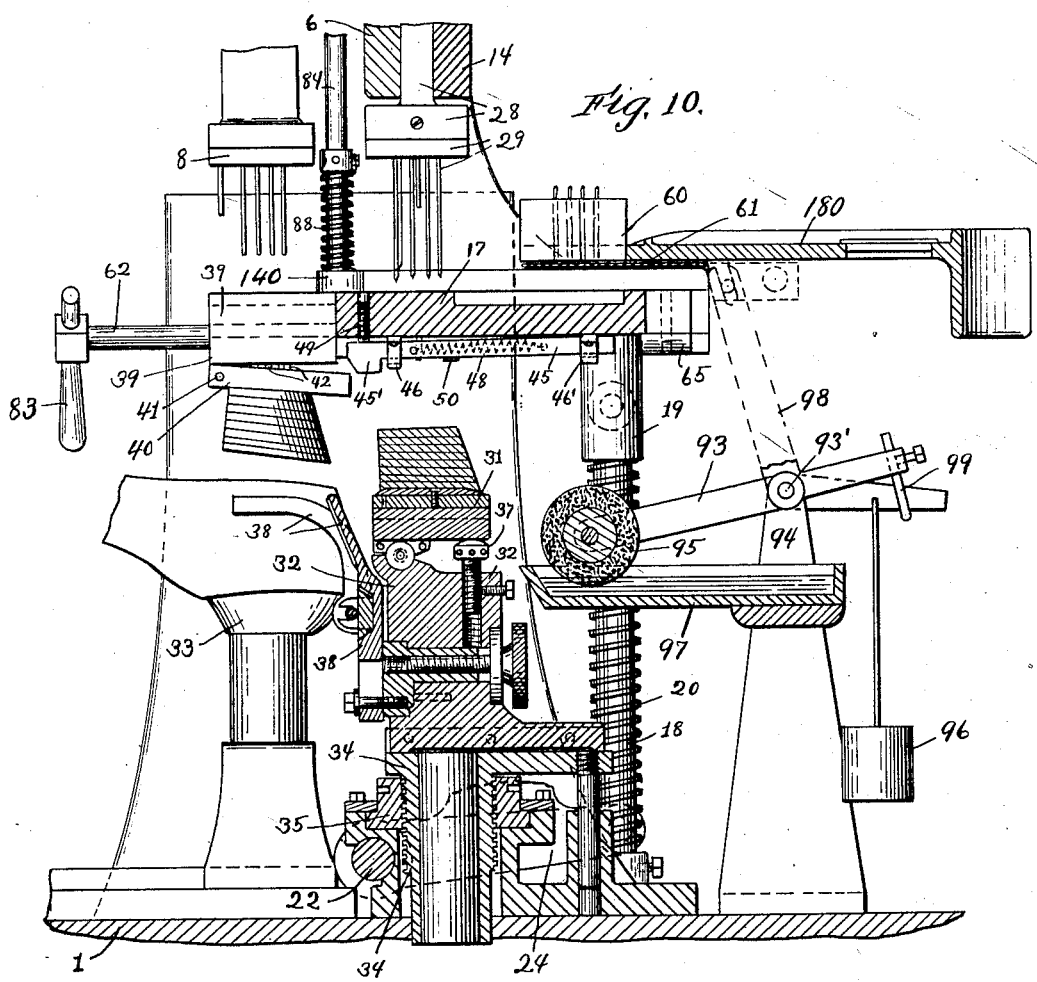
Figure 11:
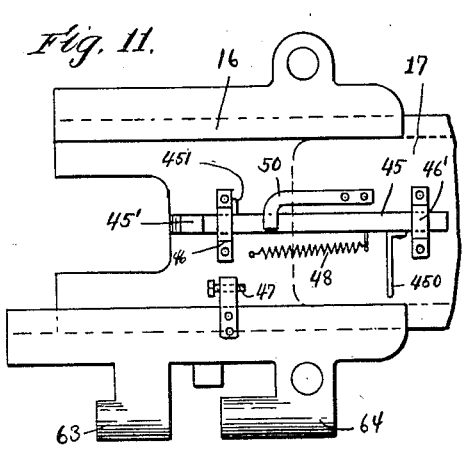
Figure 12:
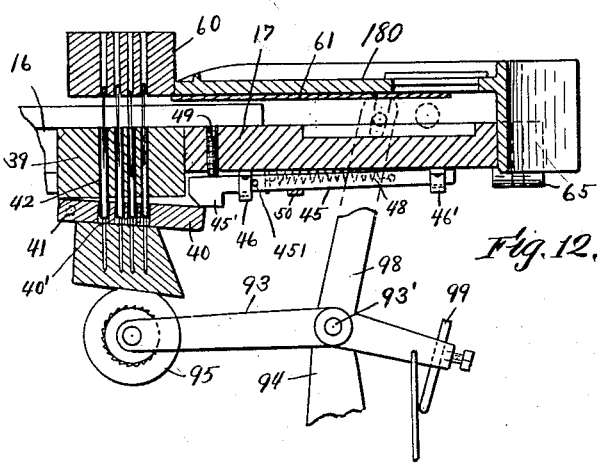

Figure 1 is a front elevation of the heel-nailing machine provided with my invention, Fig. 2 is a sectional view on the line $a$—$a$ of Fig. 1, showing the main operating parts in elevation, Fig. 3 is a rear elevation of the portion of the machine above the table, Fig. 4 is a detail view, showing the operation of the holder-locking device, Fig. 5 is a plan view of the machine, Fig. 6 is a detail plan view, partly in horizontal sections, at the line $b$—$b$ of Fig. 9, of the nail-plate-slide locking means, Figs. 7 and 8 are detail bottom and side views of the top-lift holder, Fig. 9 is a detail sectional view at the line $c$—$c$ of Fig. 6, Fig. 10 is a sectional view on an enlarged scale taken at the line $d$—$d$ of Fig. 1, Fig. 11 is a bottom plan view of the nail-plate slide, Fig. 12 is a detail sectional view at the line $d$—$d$ of Fig. 1, Figs. 13 and 14 are enlarged sectional views at the line $e$—$e$, partly broken away, at line $f$—$f$, of Fig. 5, showing the parts in different positions, Fig. 15 is a detail sectional view at line $g$—$g$ of Fig. 14, of the safety device for the nail-plate-slide and turret, Figs. 16, 17 and 18 are enlarged detail sectional views at line $d$—$d$ of Fig. 1, of the nail-plate, showing the operation during the pricking and nail-driving operations, respectively, Fig. 19 is a detail view of the upper side of the heel-plate, and Fig. 20 is a detail view of the under side of the nail-plate.

In the drawing 1 indicates the main frame of the machine having a main shaft 2 journaled therein, which is adapted to be operated by a suitable clutch mechanism, so that, when the clutch is thrown in, rotation of the shaft will be caused, and the machine will then be brought to rest in the initial position. As mechanism for accomplishing this function is well known in the art, a description thereof is unnecessary.

The main shaft 2 is provided with a crank, on which a connecting-rod 3 is journaled at one end, the opposite end of said rod 3 being connected to the lower crosshead 4, and the crosshead 4, being connected by two pairs of vertical rods 5 to the upper crosshead 6, said rods being mounted to slide in suitable bearings on the frame, so that the usual down and up movement of the upper crosshead is caused when the main shaft makes a complete revolution.

The turret 7 is mounted to oscillate on the crosshead 6 and has a driver-gang 8 and the top-lift holder 9 mounted on arms which extend radially therefrom in the usual manner. As shown in Figs. 7 and 8, the top-lift holder 9 is provided with means for holding the top-lift thereon which consists of a pair of arms 10 pivoted on opposite sides of its holding arm and connected at their ends by a bar 11, which extends parallel to the face of the plate and is adapted to swing toward and from an abutment 12 secured to the plate 9, said abutment 12 having a V-shaped recess adapted to receive the rounded end of the top-lift. A spring 13 is connected to the arms 10, and acts to press the bar 11 against the breast of the top-lift so as to hold the same firmly in position on the plate 9.

The nail-plate slide holder 14 is of angular form, and the vertical portion thereof is mounted in vertical guideways 15 on the rear side of the crosshead 6, and its horizontal portion has horizontal guideways 16 in which the nail-plate slide 17 is mounted. A pair of upright rods 18 are rigidly secured in the table of the frame and extend upwardly through said horizontal portion of said shoulder, the latter being adapted to slide vertically on said rods. A pair of sleeves 19 are slidably mounted on the rods 18, and a pair of springs 20 are mounted on the rods 18 between said sleeves and collars 21 fixed on the rods 18 adjacent the lower ends thereof. Said rods 18 are reduced in diameter at their upper ends to form shoulders on which a nail-holder frame 180 is mounted, and said frame 180 is clamped against said shoulders by nuts 18' on the upper ends of said rods 18, so that said springs 20, by pressing against the sleeves 19, normally act to press the holder 14 against the under side of frame 180. A shaft 22 is mounted to oscillate on the table of the machine, and an angular lever-arm 23 is connected thereto and extends rearwardly from said shaft and also upwardly, and is provided with a forwardly and downwardly inclined face 23' at its upper end. A pair of arms 24 are connected to the shaft 22 and extend horizontally rearward therefrom, said arms being connected by links 25 to the sleeves 19, so that when the lever 23 is swung rearwardly on the shaft 22 as a center, the sleeves 19 will be drawn downwardly against the action of the springs 20. A bracket-arm 26 is mounted on the crosshead 6, and a roll 27 is journaled thereon in position to engage the inclined face 23' as the crosshead descends, and to swing the lever 23 rearwardly.

An awl-carrier 28 is mounted to slide vertically between the back side of the crosshead 6 and the vertical portion of holder 14, and is provided with an awl-gang 29 and a short driver 30 at its lower end. A heel-holder 31 is pivotally mounted at its front end directly beneath the awl-gang 29, on a support 32 in the rear of the jack 33, said support 32 being mounted on a screw 34, vertically arranged in the table of the machine and adapted to be raised and lowered by a nut 35, to adjust the heel-holder 31 vertically. An adjusting-screw 37 is threaded in the support 32 in position to support the rear end of the holder 31, so that the inclination of said holder may be varied by raising and lowering the screw 37. The usual guiding and holding devices 38 for the shoe on the jack are provided, said devices being mounted on the holder 32.

The nail-plate slide 17 is provided with a removable nail-plate 39 at its front end, and a heel-engaging plate 40 is connected by a pivot 41 to the under side of said plate 39, adjacent the front end thereof, to permit the plate 40 to swing down to a position in which its heel-engaging face, on its under side, will be parallel to the top of a heel held on the holder 31 in position to be pricked at a rearward inclination. A series of guiding-sleeves 42 are mounted in the nail-plate 39 and project beneath the under side of said plate 39 a distance equal to the thickness of the heel-engaging plate 40, said sleeves being correspondingly arranged to the drivers 8 and awls 29 and having guiding passages therethrough of corresponding diameter. The plate 40 is provided with a series of apertures 40', which register with the passages in the sleeves 42, and are of sufficiently greater diameter than the external diameter of said sleeves 42 as to permit the plate 40 to be tilted to any angle with relation to the plate 39 necessary to enable it to conform to the inclination of the top of any heel which is likely to be pricked on the machine. The arrangement of the sleeves 42 is in the ordinary manner, as shown in Fig. 20, that is, it corresponds to the desired arrangement of nails about the edge portion of the particular heels which are to be nailed.

A lever 43 is pivoted on the upper side of the plate 40, said lever being arranged in recesses formed in said plate 40 and in the nail-plate 39, and an attaching brads or staple 44 is mounted in the plate 40 and is suspended on one end of the lever 43 in position to be driven into the heel by the short driver 30.

A locking-bar 45 is mounted to reciprocate in brackets 46, 46', on the under side of the nail-plate slide 17, see Figs. 10, 11, 12, 16, 17, and to swing vertically to a limited extent at its front end in the front bracket 46 and on the rear bracket 46' as a pivot. Said bar 45 has a head 45' at its front end and a transversely-projecting finger 450 at its rear end, the head 45' in the forward position of the bar 45 being adapted to extend over the rear end of the plate 40, which projects for a distance in the rear of plate 39, and the finger 450 being arranged to engage a stop-screw 47 on the holder 14 under certain conditions to be explained. A spring 48 is connected at one end to the under side of the slide, and at the other end to the bar 45, and acts constantly to draw the bar forwardly or toward the plate 40 and to hold a stop-pin 451 on the bar 45 against the bracket 46. A stop-screw 49 is mounted in the slide 17 in position to engage the upper side of the bar 45 adjacent its front end, and a spring-arm 50 is mounted on the under side of the slide 17 and extends beneath the bar 45 and acts constantly to hold said bar in engagement with the stop-screw 49, so that said head 45' may be adjusted vertically in either direction by merely adjusting the stop-screw 49.

The improved means which I employ for connecting the awl-holder to the crosshead, and for varying the position thereof with relation thereto, will now be described.

A locking-bolt 51 is mounted to slide horizontally in the crosshead 6, transversely thereof, and a cam 52 is mounted on the turret 7 in position to engage a depending-pin 53 on the bolt 51. An aperture 54 is provided in the upper end portion of the awl-carrier 28, said aperture being located in a position to permit the bolt 51 to enter the same in certain positions of said carrier, to lock the same to the crosshead. A locking-ball 56 is located in a tube 57, mounted in the vertical portion of the holder 14, adjacent one side of the awl-carrier, and a spring 58 is provided in said tube 57, between said ball and a stop-screw 59, to press the ball 56 against the rear side of the awl-carrier 28. The awl-carrier 28 is provided with a recess 55 on its rear side, which the ball 56 is adapted to enter when the carrier is in its uppermost position to support the same temporarily on the holder 14, as will be hereinafter more fully explained.

The frame 180 is provided with the usual nail-holder 60 in the front end thereof, and a nail-dumping plate 61 is mounted on a carrier 610, said carrier being reciprocally mounted in guideways formed in the under side of the frame 180, as indicated in dotted lines in Figs. 2 and 5, said plate being adapted to support the nails in said nail-holder when the carrier is in its forward position and to permit the nails to be discharged when it is drawn back to the position of Fig. 12.

The means which I employ for enabling the operator to change the positions of both the turret and nail-plate slide by a single operating-handle, will now be described.

A shaft 62 is journaled in bearings 63, 64, on the horizontal portion of the holder 14, and the rear end of said shaft 62 has a swivel connection (permitting limited oscillation thereof) with an arm 65, at the rear end of the nail-plate slide. A locking-bolt 66 is mounted in the holder 14, in position to enter recesses 67, 68, in one edge of the slide 17. A spring 69 is provided which is disposed to press the bolt 66 toward the slide 17, and a lug 70 is provided on a worm-gear 71, for withdrawing the bolt from the slide recesses when the shaft is turned to the left, see Fig. 9, said worm-gear 71 being splined to the shaft 62, and meshed with a corresponding gear 72 on a vertical shaft 73, which is rotatably mounted in a bearing at the side of the holder 14 and held from longitudinal movement with relation thereto by a collar 75 at the opposite side of said bearing from gear 72. Said shaft 73 is also rotatably mounted in bearings 76 on the crosshead and a worm-gear 77 is splined to the shaft 73 and arranged between the bearings 76, so that the crosshead may move with relation to the shaft carrying the gear 77 with it. A shaft 78 is rotatably mounted in the crosshead 6 and extends transversely therethrough to the front side thereof, said shaft being held from longitudinal movement therein by suitably arranged collars and having a worm-gear 79 on its rear end, which meshes with gear 77. As shown in Figs. 1 and 5, a spring-actuated locking-bolt 80 is slidably mounted in the crosshead in position to enter notches in the turret 7, to lock the same in either the nailing or spanking position. A pin 81 is provided on shaft 78 in position to engage a tooth 82 on the bolt 80, so that when shaft 78 is rotated to the right the bolt 80 will be drawn out of engagement with the turret. A handle 83 is provided on the front end of shaft 62, by means of which said shaft 62 may be both oscillated and slid longitudinally in its bearings.

The safety device which I employ comprises a shaft 84, which is mounted to rotate in lugs 140 on the front end of the holder 14 at one side of the guideways in which slide 17 moves. An arm 85, having a friction-roll 85' in its end, is secured on said shaft between said lugs, so as to hold the shaft from longitudinal movement with relation to the holder, said arm being arranged to bear against the front end of slide 17 when said slide is in position over holder 31, as shown in Figs. 6 and 13, and to bear against the side thereof when the slide is pushed forwardly from said position, as shown in Fig. 15. Said shaft 84 is rotatably and slidably mounted in lugs 600 on the crosshead, and a finger 86 is arranged between said lugs 600 and splined to the shaft 84, the spline-groove being formed in the shaft (as it also is in case of shaft 73) to permit the shaft to rotate in said lugs and the crosshead to move with relation thereto. A flange 87, having a notch 87' therein, is provided on the turret 7, so arranged that said finger 86 may be swung either into engagement with the flange or into said notch, according to the position of the turret. A spring 88, on the shaft 84, constantly tends to rotate said shaft so as to swing its arm 85 toward the slide 17.

The locking device for the holder 14 comprises a latch 89, pivoted at its lower end to a lug 90, on the table of the machine, and extending upwardly at one side of the holder 14, as best shown in Figs. 3 and 4, said latch being provided with a holding shoulder 89', which, in the lowest poistion of the holder, is adapted to engage the upper side thereof to lock the same in said position, and a spring 91 is connected to the upper end of the latch 89 and to the holder 14, and acts to hold the latch against the side thereof. An inclined face 89'' is also formed on the latch, and a pin 92 is mounted on the crosshead 6 in position to engage said face under conditions which will be described.

The device which I preferably employ for applying cement to the heel while it is supported by the nail-plate slide is shown in Figs. 2, 10 and 12, and comprises a lever 93 pivoted on a rod 93' supported by a pair of brackets 94, mounted on the table, said lever having a gluing-roll 95 on its front end and a weight 96 attached to its rear end. A tray 97, adapted to contain liquid glue or cement, is mounted on the bracket 94 directly beneath the roll 95, in position to permit the roll 95 to dip therein. A right-angular shaped lever 98 is also pivoted on the rod 93', and one arm thereof is pivotally connected at its upper end to the nail-supporting plate carrier 610, the other arm thereof having a finger 99, which is adapted to extend beneath the rear end of the lever 93.

The operation of the above-described machine is as follows: At the beginning of the operation, the turret is held in the position of Fig. 13, in which the spanking plate 9 is held in position over the jack. In this position the bolt 51 is held in the aperture 54 of the awl-carrier 28, so that the latter is firmly connected to the crosshead. A heel is placed on the holder 31, which is shown as adjusted so that the top of the heel inclines downwardly from its breast, to enable the same to be pricked at a rearward inclination, and the nail-plate slide 17 is also held in position over the heel-holder, in which position it will be locked by the bolt 66, which will enter the recess 68 in the slide, as shown in Fig. 6. The heel-engaging plate 40 will be normally held by the combined action of gravity and of the spring 48 in forcing the inclined face on the front end of the bar 45 against the upper rear corner of said plate in the position of greatest inclination to which it is permitted to move by the joint which connects it to plate 39. As the crosshead descends to perform the pricking operation, the roll 27 on the rear side thereof will engage the inclined face 23', on the upper end of the lever 23, causing the levers 24 to draw down the sleeves 19 against the action of springs 20. This permits the holder 14, which was previously supported by said springs 20, to slide downwardly in its guideways until the heel-engaging face of plate 40 rests flatly against the entire surface of the heel, said screw 49 being so adjusted that the bar 45 will engage the plate 40 to prevent it from swinging toward plate 39 at a point at which its face is exactly parallel to the top of the heel on the holder. The face of the plate 40 will thus be pressed evenly against the top of the heel throughout the entire surface thereof, as shown in Fig. 13, so that there will not be the slightest tendency to cause it to tilt on the holder 31, and, as the holder 14 and slide 17 are heavy castings, and the entire weight thereof is placed on the heel, it will be apparent that the heel will be firmly pressed against the holder 31, so that it will not become misplaced during the subsequent pricking operation, and that the force with which plate 40 is pressed against the heel is the same under all conditions. As the crosshead descends it will force down the awl-carrier 28, disengaging the same from the friction-ball 56 as soon as the holder 14 is supported by the heel. The awls 29 will then be forced down through the sleeves 42, and, as the awls descend perpendicularly, and the heel is held in an inclined position with relation thereto, they will be forced into the heel at a corresponding inclination to the top and toward the rear of the heel, the awls being guided by the sleeves 42 in close proximity to the heel, and forming a series of holes which are parallel when the bores of the sleeves are parallel, as shown. At the same time the short driver 30 forces the attaching-pin 44 into the heel, so as to connect the heel to the plate 40. As the crosshead descends, the roll 27 will travel down on the side of lever 23, after it has moved out of engagement with face 23', and hold said lever in the position to which it was moved, the side of said lever being held perpendicularly when in its rearmost position.

Much force is required to withdraw the awls from the heel, particularly if it is of pulp, and, when the awls are drawn back through the nail-plate, the heel will be drawn very forcibly against the plate 40, but as this plate is firmly locked by bar 45 in the oblique position shown in Fig. 16, this force will be evenly distributed over the entire surface of the heel, so that the heel will be prevented from tipping with relation to the awls, as the awls are stripped or withdrawn therefrom. All possibility that the awls will be broken from this cause is thus prevented, although if the plate 40 were permitted to swing up, even to a slight extent, the heel would swing on its breast edge and cause binding and possibly breakage of the awls. As the awls are stripped there is a strong tendency to pull up the leather about each awl, but as the plate 40 bears against the top of the heel about each awl this action is prevented.

It will be noted that the entire upward pressure of the heel against the plate 40, when the awls are withdrawn, is brought to bear on the nail-plate slide 17 and therefore on the holder 14, so that there will be a strong tendency to lift these parts during the first portion of the withdrawing movement, at which time the strain is particularly great, and frequently greater than the weight of said parts. Possible lifting of the holder 14 at the time the awls are withdrawn is prevented by the latch 89, the shoulder 89' of which is so arranged that when the holder 14 is permitted to move downwardly by the action of the lever 23, to press the heel on the heel-holder, the upper side of said holder will be moved opposite said shoulder 89', so that the spring 91 will swing the latch sufficiently to carry said shoulder over the upper side of the holder 14, as shown in Fig. 4, thus locking the holder 14 from upward movement, and counteracting any upward strain which is placed on said holder sufficient to lift it. As the crosshead moves upwardly the pin 92 thereon will engage the oblique surface 89'' on the latch, after the awls have been partly or wholly withdrawn, and move the same to one side, as indicated in Fig. 3, so that the holder 14 will be free to rise by the time the sleeves 19 are permitted to move upward upon the forward swinging of the lever 23, as the crosshead moves to its uppermost position.

In addition to the function of the pivoted awl-stripping plate 40 in preventing binding of the awls as they are withdrawn from the heel, a further advantage is secured over the construction of my prior patent in the arrangement of the attaching staple or brads 44 in the plate 40 and the mounting of the staple-withdrawing lever 43 on said plate. It will be noted, on reference to Fig. 16, that the brads 44 are fitted to reciprocate in holes which pass through plate 40 in a direction perpendicular to its heel-engaging face, so that, when the plate 40 is in the inclined position of Fig. 16, said brads will be held in an angular position with relation to the nail-plate 39, but will be held perpendicular to the face of the heel on which the plate 40 bears, and will be driven in this direction when forced into the heel at the time the heel is pricked. When the nail-plate is moved to the nail driving position and the plate 40 is swung up to the horizontal position shown in Fig. 17, the angular relation of the brads 44 and the heel will not be changed, but the brads will be moved to a position perpendicular to the nail-plate 39, so that bending of the staple by the heel, as the heel is pressed upon the jack and the plate 40 is swung up to the horizontal position, is prevented. That is, if the brads 44 were driven into the heel with the parts in the position of Fig. 17, but with the heel in the position of Fig. 16, it will be apparent that the brads 44 would be driven into the heel at an acute angle to the face of the heel, and when the heel was transferred to the jack and the driver block was brought to bear on the top of the nail-plate through the driver-block, the face of the heel would be swung against the face of the plate 40, causing more or less bending of the brads 44, repeated bending of which tends to cause them to break, unless they are in perfect spring temper.

The movement of the crosshead to its uppermost position causes the awl-carrier 28 to be raised until its recess 55 is opposite the locking-ball 56, so that said ball may enter therein, as shown in Fig. 2. The operator at the front of the machine then turns the shaft 62 by handle 83, withdrawing the bolt 80 from the turret, so that the latter may be swung to the position of Fig. 1, in which the drivers 8 will be held in a vertical position over the jack. This movement of shaft 62 also withdraws the bolt 66 from the recess 68, so that the operator may then, by pushing on handle 83, push back slide 17 until the nail-holes in plate 39 are directly beneath the nail-holder 60. The boy who sticks the nails in the rear of the machine then draws back the plate 61 to permit the nails, which have previously been placed in the holder, to fall into the nail-holes, as shown in Fig. 12, then he pushes the slide 17 forward until the plate 39 is over the jack in nailing position, as shown in Fig. 10, in which position the bolt 66 will enter recess 67 and lock the slide. The rear side of recess 68 is cut away, as shown in Fig. 6, so that the bolt 66 will not catch in said recess when the slide 17 is pushed forwardly. The rotation of the turret to swing the drivers to driving position acts to withdraw the bolt 51 from the awl-carrier 28, so that, as the crosshead again descends, it will not, on this movement, force down the awl-carrier and thus disengage it from the friction-ball 56, but said carrier will be supported by said ball, which is pressed into recess 55 with sufficient force to enable the holder 14 to support the carrier 28 as the crosshead descends to drive the nails, as shown in Fig. 14. The forward movement of the nail-plate slide 17 carries the arm 450 on the locking-bar 45 against the stop-screw 47 on the holder 14, so that the bar 45 is drawn back out of engagement with the plate 40, as shown in Fig. 10. The plate 40 is then free to swing upwardly, so that as the crosshead descends, permitting the holder 14 to be lowered again, to press the heel firmly against the heel-seat of the shoe on the jack, in advance of the driving action, the plate 40 will be swung against the nail-plate 39 so that its under surface will be flush with the ends of sleeves 42, and the surface of the heel will thus be held perpendicularly to the drivers, as shown in Figs. 14 and 17. The nails will then be driven and the heel attached, as shown in Fig. 17. As the ends of the sleeves 42 and the heel-engaging face of plate 40 are held in the same horizontal plane while the nails are being driven, it will be apparent that, during this operation, the plate 40 performs no essential function, as the faces at the ends of the sleeves 42 under these conditions practically perform the function of the ordinary nail plate at this time, the plate 40 merely providing an increased bearing surface for the heel, and, while the plate 40 may or may not perform the function of a nail plate, its primary function is that of an awl-stripper, although it has a secondary function, when the ends of the awls are held in the same horizontal plane, of clamping the heel in position while the awls are being advanced. A short driver 8' is connected to the driver-plate and engages the lever 43 to withdraw the attaching-brads 44 from the heel, in a manner similar to that explained in my said prior patent. As the crosshead is again lifted, permitting the holder 14 to be lifted to its initial position by springs 20, the holder, acting through the ball 56, will lift the awl-carrier 28 until the aperture 54 therein is opposite the bolt 51, so that, when the turret is next rotated to the spanking position, said bolt may again enter said aperture. As the engagement of the ball 56 is not positive, but is rather a frictional engagement, and therefore might possibly fail to lift the carrier at all times, I provide a lifting pin 100 in the crosshead, which is adapted to move in a vertical slot, 101, in the awl-carrier, when the crosshead descends to perform the nailing operation, which is so arranged with relation to the upper end of said slot that it engages the carrier at that point when both the crosshead and awl-carrier are in their uppermost position. With this arrangement, if the holder 14, acting through ball 56, should fail to lift the carrier 28, it will be positively lifted by the crosshead acting through the pin 100. After the crosshead has been raised and a top-lift has been placed in the top-lift holder, the turret is unlocked by turning shaft 62, so that it may swing by gravity to the spanking position, and the slide 17 is pushed back to the pricking position, by pushing on said shaft. The pricking operation above described is then repeated (another heel having been previously placed on the holder 31), while the top-lift is being spanked on to the heel which has just been attached.

Various important advantages are secured by having the heel-engaging plate 40 pressed upon the heel and having the heel thus pressed upon the jack by the gravity alone of the nail-plate 39, slide 17 and holder 14, so that these parts are "floating," or free to move, or be moved to any position, (within necessary limits) previous to and during the nail-driving operation, as distinguished from an action in which the plate is positively forced down to a predetermined position in advance of the driving action. The heel is always pressed against the jack, whatever the height to which the jack may be adjusted, with the same force and with sufficient force to prevent the drivers from pushing the heel from the brads, or staple 44 when they strike the nails to drive them into the heel and thus preventing said staple from performing one of its important functions, viz:—to hold the heel in place while the nails are being driven. Another important advantage resides in the fact that the action of the nails on the heel, as they are driven, usually causes the heel to be materially compressed, and when this occurs, the plate 39 will follow by its gravity, and the ends of its sleeves or bushings 42 will be maintained in contact with the heel, throughout the entire driving operation, so that the nails will always be guided and held upright by said sleeves, and the projecting ends on which the top lift is to be spanked will not be bent over or "crippled," but will be held in a perpendicular position. When, at the last portion of the driving operation, the driver block strikes the top of plate 39, as shown in Fig. 17, the plate may be, and in practice, is further depressed, causing the heel to be compressed sufficiently to close tightly the joint between the heel and the heel-seat of the shoe. With this arrangement, accurate adjustment and timing, within reasonable limits, are unnecessary.

The manner in which the safety device prevents the awl-carrier from being forced down, when the slide 17 is in attaching position, will now be described.

When slide 17 is in either the nail receiving or the pricking position, its front end will not extend beyond the front end of the guideways in which the slide is mounted, so that when the slide is in either of these positions the spring 88 will hold the arm 85 against the front end of the said guideways in front of the slide, as shown in Figs. 6 and 13. When the arm 85 is in this position, the finger 86 on the upper end of rod 84 will be held at one side of the flange 87 on the turret. When the turret has been moved to the nail-driving position, the notch 87' in said flange 87 will be held opposite said finger 86, so that when the slide 17 is pushed forwardly into position over the jack, its front end will engage the arm 85 and swing it to one side of said guideway, as shown in Figs. 5 and 15, causing finger 86 to be swung into said notch 87', so that the turret will then be locked in nailing position, and it will not be possible to move it until the slide 17 has been drawn back to the pricking position. It will thus be impossible to turn the turret to the top-lift spanking position while the slide is in the nailing position. If, however, while the slide 17 is in one of its rear positions, and the turret is in spanking position, it should be attempted to push forward the slide to the nailing position, the finger 86 would be immediately swung against the flange 87, before the arm 85 had been swung to one side of the slide 17, thus making it impossible to push the slide forwardly to an appreciable extent until the turret had been turned to nailing position. The turret and nail-plate slide will thus always be held in the related positions in which they are designed to be held, and all possibility of accident is thereby avoided.

The operation of the heel-gluing device is as follows: Before the nails are stuck in the holder 60 the supporting slide 61 is pushed forward, swinging lever 98, so that its finger 99 lifts the weighted end of lever 93 and dips the roll 95 into the glue in tray 97. When the slide 17 is drawn back to the nail-receiving position, the heel which has been attached thereto will be directly over the roll 95, so that, when the slide 61 is drawn back to dump the nails, the lever 98 will be swung back, permitting the weight 96 to lift the roll 95, so that it engages the heel and rolls thereon to the back side thereof from the point engaged, as the slide 17 is again pushed forward.

It has been invariably considered necessary, so far as I am aware, in gluing a heel by hand or by machine, that no glue be applied to the heel adjacent the breast, for the reason that, in breasting the heel, the part shaved off would stick to the shank of the shoe, and for this reason I arrange the lever 93, so that the gluing-roll will engage the heel at a distance in the rear of its breast, and no glue will be applied to the portion adjacent the breast.

Having described by invention, what I claim as new and desire to secure by Letters Patent is:

1. In combination with a heel holder, a die block having a series of passages therethrough, a work-engaging plate pivotally mounted thereon at the side of said block next said holder and having corresponding apertures therethrough, means whereby said block and said plate may be moved to clamp a heel against said holder, a gang of awls movable through said block and plate in predetermined paths, fixed guiding devices for said awls, and means to hold said plate with its work-engaging face oblique to the path of said awls.

2. In combination with a heel holder constructed to hold a heel with its top at different inclinations, a carrier having an awl-gang thereon and movable to and from said holder to prick a heel according to the inclination at which it is held thereby, about substantially its entire edge portion, an awl-stripper plate disposed between said carrier and said holder having a heel-engaging face at its side next the holder, and means for holding said plate with its face in engagement with the top of a heel held on said holder constructed for adjustment to different inclinations to correspond with the inclination at which the top is held, said plate having apertures formed to permit the awls to pass therethrough at different angles with relation to said face.

3. In combination with a heel-holder, an awl-stripping plate having a heel-engaging face and apertures leading therethrough to said face, a series of awl-guides disposed in said apertures and terminating adjacent said face, holding means for said plate constructed for adjustment to vary the inclination of said face with relation to said awl-guides, and hold said face in planes parallel to the tops of heels held at different inclinations by said holder, and a gang of awls reciprocal in said guides to prick a heel held on said holder, said holding means being adapted to hold said plate against the action of the awls when they are withdrawn from the heel.

4. In combination with a heel-holder, an awl-stripping plate having a heel-engaging face and apertures leading therethrough to said face, an awl-guide supported at the opposite side of said plate from said holder, having a series of projections extending loosely into said apertures and having awl-passages leading therethrough to the ends thereof, supporting-means for said plate constructed for adjustment to vary the inclination of said face with relation to said awl-passages and to hold the face in planes parallel to the tops of heels held at different inclinations by said holder, and a gang of awls reciprocal in said passages to prick a heel on said holder, said supporting means being arranged to hold said plate against the action of the awls when they are withdrawn from the heel.

5. In combination with a heel-holder and an awl-gang reciprocal in predetermined paths to prick a heel held thereby, an awl-stripping plate pivotally supported in position to swing into engagement with the top of a heel held in position to be pricked with its top disposed obliquely to said paths and having apertures to permit the awls to pass therethrough, and means for engaging said plate to hold the same from swinging away from said holder as the awls are withdrawn from the heel.

6. In combination with a heel-holder and an awl-gang reciprocal in predetermined paths to prick a heel held thereby, a support having an awl-stripper plate pivotally connected thereto in position to swing into engagement with the top of a heel held in position to be pricked and adapted to permit the awls to pass therethrough and means for limiting the swinging movement of said plate away from said holder, at different points.

7. In combination with a heel-holder and an awl-gang reciprocal in predetermined paths to prick a heel held thereby, an awl-stripping plate pivotally supported in position to swing into engagement with the top of a heel held in position to be pricked and adapted to permit the awls to pass therethrough, and an adjustable stop for engaging the plate to limit the swinging movement thereof, away from said holder, at different points.

8. In combination with a heel-holder and an awl-gang reciprocal in predetermined paths to prick a heel held thereby, a support, an awl-stripping plate pivotally connected to said support in position to swing into engagement with the top of a heel held in position to be pricked, and adapted to permit the awls to pass therethrough, means on said support for engaging said plate to limit the swinging motion thereof away from said holder, and means for relatively moving said support and said holder to clamp a heel therebetween as the awls are advanced, and for holding said support against the action of the awls as they are stripped.

9. In combination with a heel-holder and an awl-gang reciprocal in predetermined paths to prick a heel held thereby, a support having an awl-stripping plate pivotally connected thereto in position to swing into engagement with the top of a heel held in position to be pricked, and adapted to permit the awls to pass therethrough, an adjustable stop on said support disposed to limit the swinging movement of said plate away from said holder, at different points, and means for relatively moving said support and said holder to clamp a heel therebetween, as the awls are advanced and for holding said support against the action of the awls as they are retracted.

10. In a heel-nailing machine having heel-supporting means, a nail-plate having a series of passages therethrough, an awl-gang and a driver-gang movable through said passages successively, to perform the pricking and nailing operations on heels held by said supporting means, a stripper for said awl-gang, and means to lock said stripper between said plate and said supporting means during the pricking operation and to unlock it during the nailing operation.

11. In a heel-nailing machine, an awl-stripping plate having a series of apertures, an awl-gang and a driver-gang movable in predetermined parallel paths through said apertures successively to perform the pricking and heeling operations and means for holding said plate at one angle to said paths when one operation is performed, and at a different angle thereto when the other is performed.

12. In a heel-nailing machine having a series of nail guides, an awl-gang and a driver-gang movable through said guides successively to perform the pricking and nailing operations, means for holding a heel with its top or tread face in different angular positions with relation to said guides during said operations, and an awl-stripper having a heel-engaging face and movable with relation to said guides to corresponding angular positions during said operations.

13. In a heel-nailing machine an awl-gang and a driver-gang vertically movable to perform the pricking and nailing operations, means for holding a heel with its top inclined with relation to the paths of the awls, an awl-stripper and means for holding the same in position to engage the top of the heel adjacent each awl to hold the heel from tipping as the awls are stripped, and means permitting movement of said stripper to permit the heel to be held with its top in a horizontal position during the nailing operation.

14. In a heel-nailing machine a die-block having a series of guiding passages therethrough and a heel-engaging face disposed perpendicularly to said passages, an awl-gang and a driver-gang movable through said passages, successively to perform the pricking and nailing operations, means for supporting a heel with its top extending obliquely with relation to said face, as the awls are forced into the heel, an awl-stripper disposed to engage the portions of the top of the heel more remotely situated with relation to said face to prevent the heel from swinging toward said face as the awls are withdrawn and means permitting relative movement of said stripper and said die block to permit the top of the heel to be held parallel to said face during the nailing operation.

15. In a heel-nailing machine, an awl-gang and a driver-gang movable in predetermined parallel paths respectively to perform the pricking and nailing operations, and means for supporting a heel with its top inclined to said paths having clamping means coöperating therewith to hold the heel in said position during the pricking operation, and movable to permit the heel to be held with its top in a different position during the nailing operation.

16. In a heel-nailing machine an awl-gang and a driver-gang movable in predetermined parallel paths respectively to perform the pricking and nailing operations, and means for supporting the heel with its top inclined to said paths having clamping means coöperating therewith to hold the heel in said position during the pricking operation, and movable to permit the heel to be held with its top perpendicular to said paths during the nailing operation.

17. In a heel-nailing machine having a series of nail-guides, an awl-gang and a driver-gang movable through said guides successively to perform the pricking and nailing operations, an awl-stripper, for engaging the top of the heel during said pricking operation, through which said guides are adapted to extend in operative relation to the heel and means for holding said awl-stripper in different angular positions with relation to said guides during said operations.

18. In a heel-nailing machine having a series of nail-guides, an awl-gang and a driver-gang movable through said guides successively to perform the pricking and nailing operations, an awl-stripping plate having a series of apertures therethrough in which said nail-guides are located and means for holding said plate at different angles with relation to said nail-guides during said operations.

19. In a heel-nailing machine, a heel-engaging plate having a series of apertures therethrough and a heel-engaging face, an awl-gang and a driver-gang successively movable in predetermined parallel paths through said apertures to perform the pricking and nailing operations, and means for holding said plate with its face oblique to said paths during the pricking operation and with its face perpendicular to said paths during the nailing operation.

20. In a heel-nailing machine, a nail-plate having a series of guiding passages therethrough, a heel-engaging plate having apertures therethrough disposed in alinement with said passages and having a heel-engaging face at the opposite side thereof from the nail-plate, an awl-gang and a driver-gang movable through said passages and said apertures successively to perform the pricking and nailing operations and means for holding said heel-engaging plate with its face oblique to said passages during the pricking operation and with its face perpendicular to said passages during the nailing operation.

21. In a heel-nailing machine, a nail-plate having a series of guiding passages therethrough, a heel-engaging plate pivoted to said nail-plate at one side of said passages and having a heel-engaging face at the opposite side thereof from the nail-plate, and a series of apertures therethrough registering with said passages, an awl-gang and a driver-gang movable through said passages and said apertures successively to perform the pricking and nailing operations, and means for locking said heel-engaging plate with its face oblique to said passages during the pricking operation and for unlocking it to permit it to swing toward the nail-plate during the nailing operation.

22. In a nailing machine, a support having a series of projections provided with guiding passages extending to the end thereof, a heel-engaging plate movably connected to said support and having a heel-engaging face and apertures therethrough into which said projections loosely extend, an awl-gang and a driver-gang movable through said passages successively to perform the pricking and nailing operations, and means for locking the heel-engaging plate with its face oblique to said passages during the pricking operation and for unlocking it to permit it to move to a position perpendicular thereto during the nailing operation.

23. In a heel-nailing machine having an awl-gang and a driver-gang, a nail-plate having a series of depending nail-guides terminating in a predetermined plane perpendicular to the guide passages therethrough, and in which the awls and drivers are adapted to move successively to perform the pricking and nailing operations, a heel-engaging plate having a series of apertures therethrough and a heel-engaging face at its under side, said heel-engaging plate being pivotally connected to the under side of said nail-plate with the depending portions of said nail-guides disposed therein and arranged to swing its upper side against the under side of the nail-plate to hold its said face in said plane during the nailing operation, and to swing downwardly to hold said face obliquely to said plane during the pricking operation, and means for locking said heel-engaging plate in said oblique position.

24. In a heel-nailing machine of the character described, a heel-holder, a jack, an awl-gang and a driver-gang respectively movable toward said holder and said jack to perform the pricking and nailing operations, a nail-plate having a carrier for holding the same in guiding position with relation to said holder and jack, a heel-engaging plate pivoted on said nail-plate and adapted to be held with its heel-engaging face at an oblique angle to the path of the awls, and a locking device for holding said heel-engaging plate in said oblique position when the carrier is in pricking position, and for releasing it when the carrier is moved into nailing position, to permit it to swing against the nail-plate.

25. In a heel-nailing machine of the character described, a heel-holder, a jack, an awl-gang and a driver-gang respectively movable toward said holder and said jack to perform the pricking and nailing operations, a nail-plate having a carrier for holding the same in guiding position with relation to said holder and jack, a heel-engaging plate pivoted on said nail-plate and adapted to be held with its heel-engaging face at an oblique angle to the paths of the awls, a locking device for normally holding said heel-engaging plate in said oblique position, and means for moving said locking device out of locking position as the carrier is moved to nailing position.

26. In a heel-nailing machine of the character described, a heel-holder, a jack, an awl-gang and a driver-gang respectively movable toward said holder and said jack to perform the pricking and nailing operations, a nail-plate having a carrier for holding the same in guiding position with relation to said holder and jack, a heel-engaging plate pivoted on said nail-plate and adapted to be held with its heel-engaging face at an oblique angle to the paths of the awls, a locking device mounted on the carrier having means for normally holding it in position to lock the heel-engaging plate in said oblique position, and means for moving said device to an inoperative position as the carrier is moved to the nailing position.

27. In a heel-nailing machine of the character described, a heel-holder, a jack, an awl-gang and a driver-gang respectively movable toward said holder and said jack to perform the pricking and nailing operations, a nail-plate slide movable into guiding positions over said holder and said jack, a heel-engaging plate pivoted at its front end on said slide and adapted to be held with its heel-engaging face at an oblique angle to the paths of the awls, a locking device mounted on the slide in the rear of said plate and having means for normally holding it in position to engage the rear end of said plate to prevent upward swinging movement thereof, and means for engaging said locking device to move the same out of engaging position as the slide is moved into nailing position.

28. In a heel-nailing machine, a nail-plate slide, a heel-clamping plate mounted thereon to swing into an oblique position with relation thereto, a locking-bar supported on said slide and movable longitudinally to lock and unlock said plate, and movable transversely to engage said plate in different positions, and means for holding said bar in different positions of transverse adjustment.

29. In a heel-nailing machine having a vertically-moving crosshead and a turret mounted thereon, a vertically-movable awl-carrier, and a locking device disposed to be operated by the turret as it is moved between its positions of use for connecting and disconnecting the crosshead and the carrier.

30. In a heel-nailing machine having a vertically-moving crosshead and a turret mounted thereon, a vertically-movable awl-carrier, means for connecting said carrier to the crosshead when the turret is in one position, and for disconnecting it therefrom when the turret is in another position, and means for supporting the carrier independently of the crosshead when the latter is disconnected therefrom.

31. In a heel-nailing machine having a vertically-moving crosshead and a turret mounted thereon, a vertically movable awl-carrier, means for connecting said carrier to the crosshead when the turret is in one position, and for disconnecting it therefrom when the turret is in another position, and a friction device for supporting the carrier independently of the crosshead when the latter is disconnected therefrom.

32. In a heel-nailing machine having a vertically-moving crosshead and a turret mounted thereon, a vertically-movable awl-carrier, a locking device, means controlled by the turret for operating said locking device to connect and disconnect the crosshead and the carrier, and means on the crosshead, independent of said locking device, for moving the carrier into position to be locked.

33. In a heel-nailing machine having a vertically-moving crosshead and a turret mounted thereon, a vertically-movable awl-carrier, a locking device, means controlled by the turret for operating said locking device to connect and disconnect the crosshead and the carrier, a friction device for supporting the carrier independently of the crosshead when the locking device is in position to disconnect the same therefrom, and means on the crosshead, independent of said locking device, for lifting said carrier into position to be locked.

34. In a heel-nailing machine having a vertically-movable crosshead, a vertically-movable awl-carrier, and a vertically-movable nail-plate-slide holder, means for connecting said carrier to the crosshead to perform the pricking operation on one movement thereof and for disconnecting it therefrom on another movement thereof, and means for supporting the carrier on said holder when it is disconnected from the crosshead.

35. In a heel nailing machine having a heel support and a vertically movable holder having a heel-clamping plate supported thereby, a vertically movable supporting means for said holder normally acting yieldingly to sustain the same in an elevated position, operating devices for acting on a heel held on said support, actuating means for said operating devices and means independent of said holder and acting directly on said supporting means and disposed to be operated by said actuating means when moved to actuate said operating devices, for lowering said supporting means in advance of the engagement of said operating devices with the heel to permit the holder to be lowered by its gravity and thereby to clamp the heel on said support.

36. In a heel nailing machine having a heel support and a vertically movable holder having a heel-clamping-plate supported thereby, a vertically movable supporting means disposed beneath said holder and normally acting yieldingly to sustain the same in an elevated position, operating devices for acting on a heel held on said support, actuating means for said operating devices, and lever mechanism independent of said holder and movable a predetermined distance by said actuating means, during the initial portion of the actuating movement thereof, to lower said supporting means and permit said holder to be lowered by its gravity and its plate to rest on the heel on said support to clamp the same in position in advance of the engagement therewith by said operating devices.

37. In a heel nailing machine, having a vertically movable head, driving-mechanism therefor, a heel-support and a vertically movable nail-plate holder, a spring for supporting said holder in raised position, means independent of said holder, disposed to be actuated by said driving-mechanism during an initial movement of the head, to compress said spring and permit the holder to be lowered by its gravity and press a heel on said support, and means to permit said spring to expand to lift the holder upon the return movement of the head.

38. In a heel nailing machine, a vertically movable head, actuating mechanism therefor, a heel-support, and a vertically movable nail-plate, a spring for supporting said plate in raised position, and means operated by said actuating mechanism during an initial movement of the head constructed to compress said spring and permit the plate to be lowered by its gravity to press a heel on said support in advance of the operation thereon by the head, substantially as described.

39. In a heel-nailing machine having a cross-head and a turret mounted thereon, a nail-plate slide having guideways in which it is reciprocally mounted beneath the cross-head, independent locking devices for said turret and for said slide and means for simultaneously moving said locking devices to unlocked position to permit said slide to be moved in its guideways and said turret to be rotated.

40. In a heel-nailing machine having a cross-head and a turret mounted thereon, a nail-plate slide having guideways in which it is reciprocally mounted beneath the cross-head, independent locking devices for said turret and for said slide and a handle movable to operate both of said locking devices to unlock the turret and the slide, to permit the turret to be rotated and the slide to be moved in its guideways.

41. In a heel-nailing machine having a crosshead, a turret mounted thereon, and a nail-plate slide, reciprocally mounted beneath said cross-head, independent locking devices for said turret and for said slide, a handle, and means, operated by said handle, for moving said locking devices to unlock the turret and slide, and for moving the slide to different positions.

42. In a heel nailing machine having a cross-head, a turret mounted thereon and a nail plate slide reciprocally mounted beneath said cross-head, independent locking devices for said turret and for said slide, and a handle connected to said slide and having means, disposed to be operated thereby when moved to one position, for moving said locking devices to unlocked position, and, when moved to another position to move said slide in its guideways.

43. In a heel-nailing machine, a nail-plate slide having a locking device, a shaft extending longitudinally of said slide and having a swivel connection therewith, connections between said locking device and said shaft for moving said device to unlock the slide upon rotative movement thereof, and a handle for moving said shaft rotatably and longitudinally.

44. In a heel-nailing machine having a crosshead, a turret mounted thereon, and a nail-plate slide, locking devices for said turret and for said slide, a shaft extending longitudinally of the slide, and having a swivel connection therewith, means operated by the shaft upon rotative movement thereof for moving said locking devices to unlock the turret slide, and a handle on the shaft for moving it rotatably and longitudinally.

45. In a heel-nailing machine having an independently movable turret and nail-plate, the turret being movable between a nailing and a spanking position and the nail-plate between a retracted and a nailing position, and a locking device controlled by the plate on movement thereof from its retracted position to lock the turret in nailing position.

46. In a heel-nailing machine having an independently movable turret and nail-plate, the turret being movable between a nailing and a spanking position and the nail-plate between a retracted and a nailing position, and a locking device movable independently of said turret and plate and controlled by said turret upon movement thereof from its nailing position to lock the plate in its retracted position.

47. In a heel-nailing machine having an independently movable turret and nail-plate, the turret being movable between a nailing and a spanking position and the nail-plate between a retracted and a nailing position, and a locking device interposed between the turret and the nail-plate and controlled to lock the turret in nailing position when the nail-plate is also in nailing position.

48. In a heel-nailing machine having an independently movable turret and nail-plate, the turret being movable between a nailing and a spanking position and the nail-plate between a retracted and a nailing position, and a locking device controlled to lock the turret in nailing position upon movement of the plate from its retracted position, and to lock the plate in its retracted position upon movement of the turret from nailing position.

49. In a heel-nailing machine having an independently movable turret and nail-plate, the turret being movable between a nailing and a spanking position and the nail-plate between a retracted and a nailing position, and a locking-device interposed between the turret and the nail-plate for preventing movement of the nail-plate to nailing position when the turret is in spanking position, and for locking the turret in nailing position when the nail-plate is also in nailing position.

50. In a heel-nailing machine having an independently movable turret and nail-plate, the turret being movable between a nailing and a spanking position and the nail-plate between a retracted and a nailing position, and a locking device interposed between the turret and the nail-plate and movable to lock the turret in nailing position as the nail-plate is moved from its retracted position.

51. In a heel-nailing machine having an independently movable turret and nail-plate, the turret being movable between a nailing and a spanking position and the nail-plate between a retracted and a nailing position, and a locking device disposed to be moved by the plate to lock the turret in nailing position upon movement thereof from its retracted position.

52. In a heel-nailing machine having an independently movable turret and nail-plate, the turret being movable between a nailing and a spanking position and the nail-plate between a retracted and a nailing position, and a locking device disposed to be held by the turret when in spanking position to lock the plate from movement to nailing position, and to be moved by the plate to lock the turret in nailing position on movement thereof from its retracted position.

53. In a heel-nailing machine having an independently movable turret and nail-plate, the turret being movable between a nailing and a spanking position and the nail-plate between a retracted and a nailing position, and an independently movable locking device interposed between the turret and the nail-plate and movable by one, as it is moved to one position, to lock the other in the corresponding position.

54. In a heel-nailing machine having an independently movable turret and nail-plate, the turret being movable between a nailing and a spanking position and the nail-plate between a retracted and a nailing position, and a locking device movable in opposite directions between the turret and the plate to lock one and unlock the other when they are in corresponding positions.

55. In a heel-nailing machine having an independently movable turret and nail-plate, the turret being movable between a nailing and a spanking position and the nail-plate between a retracted and a nailing position, and a locking device movable to opposite positions between the turret and the plate to lock one and unlock the other when they are in either of their corresponding positions and being disposed to be moved by one to one locking position and having means for automatically moving it to the other locking position.

56. In a heel-nailing machine having an independently movable turret and nail-plate, the turret being movable between a nailing and a spanking position and the nail-plate between a retracted and a nailing position, and a locking device interposed between said turret and plate and movable independently thereof and having means for engaging the turret when in one position to lock the plate from moving from the corresponding position.

57. In a heel-nailing machine having an independently movable turret and nail-plate, the turret being movable between a nailing and a spanking position and the nail-plate between a retracted and a nailing position, and a locking device interposed between said turret and plate and having means for engaging the plate, as it is moved to one position to move said device to lock the turret in the corresponding position.

58. In a heel-nailing machine having an independently movable turret and nail-plate, the turret being movable between a nailing and a spanking position and the nail-plate between a retracted and a nailing position, and a locking device interposed between said turret and plate and having means for engaging the turret when in spanking position to lock the plate from moving to nailing position and having means for engaging the plate as it is moved from its retracted position to move said device to lock the turret in nailing position.

59. In a heel-nailing machine having an independently movable turret and nail-plate, the turret being movable between a nailing and a spanking position and the nail-plate between a retracted and a nailing position, and a locking device therefor, comprising a shaft having a plate-engaging arm and a turret-engaging arm, the plate-engaging arm being disposed to be engaged by the plate as it is moved to nailing position to move the turret-engaging arm to lock the turret in nailing position.

60. In a heel-nailing machine having an independently movable turret and nail-plate, the turret being movable between a nailing and a spanking position and the nail-plate between a retracted and a nailing position, and a locking device therefor, comprising a shaft having a plate-engaging arm and a turret-engaging arm, said turret having an abutment disposed to be engaged by the turret-engaging arm when the turret is in spanking position to hold the plate-engaging arm in position to prevent movement of the plate to nailing position.

61. In a heel-nailing machine having an independently movable turret and nail-plate, the turret being movable between a nailing and a spanking position and the nail-plate between a retracted and a nailing position, and a locking device therefor comprising a shaft having a plate-engaging arm and a turret-engaging arm, the plate-engaging arm being disposed to be engaged by the plate, as it is moved to nailing position, to move the turret-engaging arm to lock the turret in nailing position, and the turret having an abutment disposed to be engaged by the turret-engaging arm when the turret is in spanking position to hold the plate-engaging arm in position to prevent movement of the plate to nailing position.

62. In a heel nailing machine a vertically movable awl-stripping plate, an awl-gang vertically reciprocal through said plate to prick a heel held therebeneath, a locking device movable to lock said plate in a depressed position to hold the same against the action of the awls as they are withdrawn from the heel and means, timed with relation to the lifting movement of the awls, for automatically moving said locking device to unlocked position to permit the plate to be lifted.

63. In a heel nailing machine a vertically movable awl-stripping plate, an awl-gang vertically reciprocal through said plate to prick a heel held thereby, means for locking said plate in a depressed position, and means for automatically lifting the awls and unlocking the plate, successively.

64. In a heel nailing machine having a vertically movable cross-head, a vertically movable awl-gang connected thereto, a vertically movable heel-clamping plate through which said awl-gang is adapted to pass to prick a heel held by said plate, means for locking said plate against the action of the awls on the heel as they are withdrawn therefrom and means, operated by the cross-head during the lifting movement thereof, for unlocking said plate to permit the same to be lifted.

65. In a heel nailing machine having a frame, a vertically movable cross head mounted thereon, a vertically movable heel-clamping plate, an awl-gang connected to said cross-head and movable through said plate to prick a heel held thereby, a latch connected to said frame and having means for causing the same to engage said plate to lock the same in depressed position, and means, operated by the cross-head during its upward movement for moving said latch to unlock said plate.

66. In combination with a vertically reciprocating awl-gang, a plate having a series of guiding tubes mounted therein having their ends arranged in an approximately horizontal plane, a holder for holding a heel to be pricked with its tread face inclined downwardly to said plane from front to rear, and means for engaging the rear portion of said face of the heel to hold the heel from tilting as the awls are stripped by engagement of the front portion of the heel with the adjacent ends of the tubes, substantially as described.

67. In a heeling machine, a vertically adjustable jack, a nail-plate vertically movable over said jack, and a support for sustaining said plate in a position above the jack, and movable to permit said plate to be lowered by its gravity to press a heel upon the jack in the various positions of adjustment thereof, substantially as described.

68. In a heeling machine, a vertically adjustable jack, a nail-plate vertically movable over said jack, a support for sustaining said plate in a position above the jack, nail-driving means, operating-mechanism therefor, and means, automatically actuated by said operating-mechanism during an initial movement thereof, to lower said support to permit said plate to be lowered by its gravity to press a heel upon the jack in advance of the operation of said driving means, and to raise said support to lift the plate during the return movement of said mechanism, substantially as described.

69. In a heeling machine, a vertically adjustable jack, a nail-plate vertically movable over said jack, a support for normally sustaining said plate in a position above the jack and movable to permit the plate to be lowered by its gravity to press a heel upon the jack in the various positions of adjustment thereof, vertically reciprocating nail-driving means, operating mechanism therefor, and means for automatically moving said support to lift said plate during the return movement of said nail-driving means, substantially as described.

70. In a heeling-machine, a heel holder, a heel-engaging plate movable to different angular positions with relation to the holder, and means, mounted on said plate and movable therewith, to connect a heel to the plate while in said different positions thereof, substantially as described.

71. In a heeling-machine, a heel holder, a heel-engaging plate movable to different angular positions with relation to the holder, and means, mounted on said plate and movable therewith, to support a heel with its face against the plate while in said different positions, substantially as described.

72. In a heeling-machine, a nail-plate, a heel-holding brad supported by said plate, means for forcing the brad into a heel while the brad is held in one angular position with relation to the plate, and means permitting movement of the brad while in the heel to a different angular position with relation to the plate to permit angular movement of the heel with relation to the plate without bending action on the brad, substantially as described.

73. In a heeling-machine, a nail-plate, a heel-engaging plate pivotally connected thereto to permit the heel-engaging face thereof to be held in different angular positions with relation to said nail-plate, a heel-holding brad reciprocally mounted in said heel-engaging plate, and means for forcing said brad beyond the face of the plate, substantially as described.

74. In combination with a heel holder, a die block having a series of guiding tubes rigidly mounted therein and projecting therefrom toward said holder, and a work-engaging plate pivotally connected to said block, and having a series of apertures therethrough into which the projecting end-portions of said tubes extend, said apertures being shaped to permit swinging movement of said plate on its pivot.

75. In combination with a heel holder, a die block having a series of guiding tubes rigidly mounted therein and projecting therefrom toward said holder, and a work-engaging plate pivotally connected to said block, at one side of said tubes and having a series of apertures therethrough, into which the projecting end portions of said tubes loosely extend, whereby swinging movement of said plate on its pivot is permitted.

76. In combination with a heel holder, a die block having a series of passages extending therethrough, a correspondingly apertured, heel-engaging plate pivotally connected to said block to swing out of and into engagement therewith, and having a work-engaging face at its opposite side from said block facing said holder, and a series of guiding tubes mounted in the passages of said block and having end portions extending through the apertures of said plate, and terminating approximately flush with the work-engaging face thereof when the plate is held against said block, said apertures and the end portion of said tubes being relatively shaped to permit said plate to be swung into an angular position with relation to said block.

In testimony whereof, I have signed my name to this specification, in the presence of two subscribing witnesses.

GEORGE M. PETTENGILL.

Witnesses:
LOUIS H. HARRIMAN,
H. B. DAVIS.